United States Patent [19]

Dostoomian et al.

[11] 4,274,154
[45] Jun. 16, 1981

[54] LUMINOUS CLOCK DISPLAY USING OPTICAL FIBERS

[75] Inventors: A. S. Dostoomian; Alan C. Traub, both of Canton, Mass.

[73] Assignee: Vanzetti Infrared & Computer Systems, Inc., Canton, Mass.

[21] Appl. No.: 130,291

[22] Filed: Mar. 14, 1980

[51] Int. Cl.$^3$ .......................................... G04C 19/00
[52] U.S. Cl. ...................................... 368/82; 368/239
[58] Field of Search .................. 368/77, 79, 82–84, 368/227, 239–242

[56] References Cited

U.S. PATENT DOCUMENTS

| | | | |
|---|---|---|---|
| 3,525,209 | 8/1970 | Ladas | 368/79 |
| 3,562,746 | 2/1971 | Aron | 340/380 |
| 3,566,602 | 3/1971 | Bergey et al. | 58/50 R |
| 3,593,517 | 7/1971 | Knippler | 58/50 R |
| 3,651,634 | 3/1972 | Cooper | 58/50 R |
| 3,775,964 | 12/1973 | Fukumoto | 58/50 R |
| 3,962,702 | 6/1976 | Kriege | 340/380 |

Primary Examiner—Vit W. Miska
Attorney, Agent, or Firm—Seidel, Gonda, Goldhammer & Panitch

[57] ABSTRACT

A clock is provided having a luminous digital display. The clock is enclosed in a housing having a glass covered display face. A stationary light source is provided within the housing. The first end of each of a plurality of optical fiber light conductors are mounted in annular concentric bands on a mounting board inside of the clock. The second end of each of the optical fiber light conductors are arranged in a pattern on the display face to indicate time. The light guides receive light from the light source and cause illumination of the display. Filters are mounted on arms which are in turn rotatably attached to the output shafts of a clock motor. The arms are disposed in such position that the filters come between the light source and the first ends of a group of light conductors as the filters rotate, filtering the light received by that group of conductors, and creating a colored display of time information at the second ends.

A special arrangement of the light guides produces a simulated pendulum effect. An arrangement of a stationary filter disc in register with a rotating filter disc utilizes a vernier principle to allow use of a lesser number of output shafts of the clock motor. The display produced by the stationary and rotating discs is a moire pattern of light intensities which streaks across the time scale.

8 Claims, 8 Drawing Figures

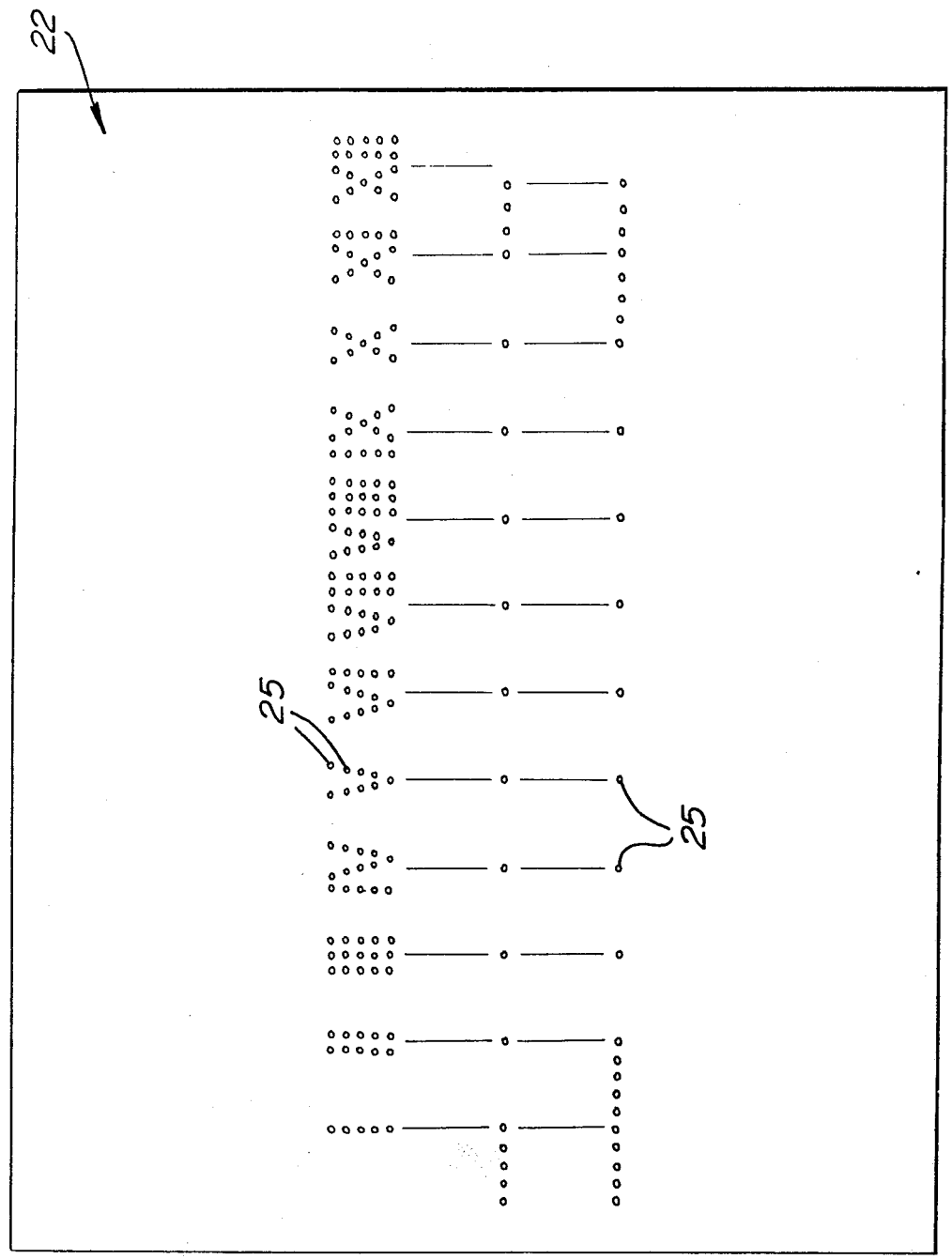

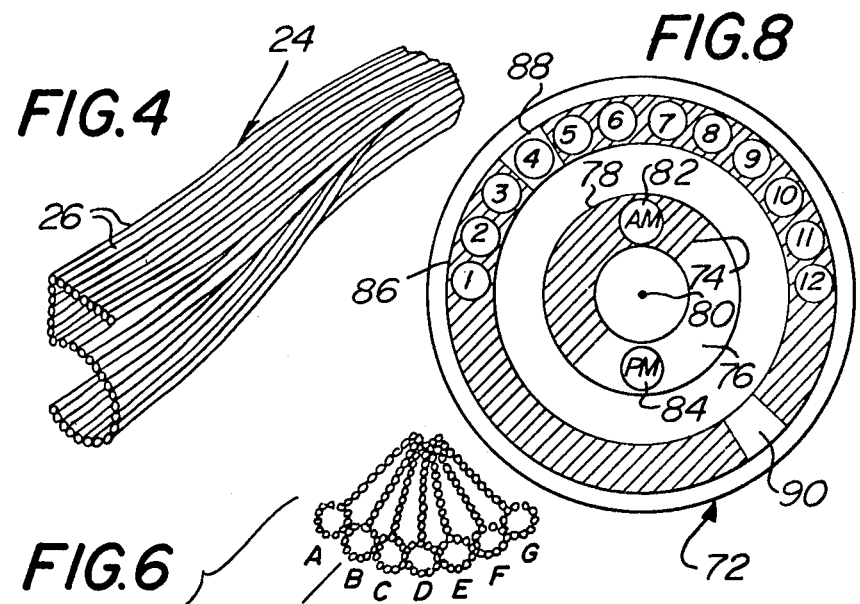
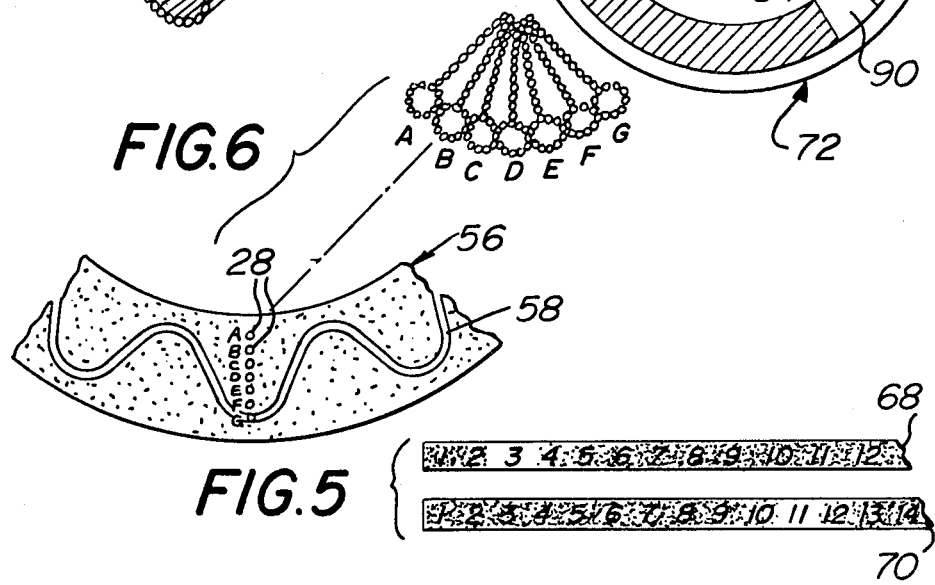
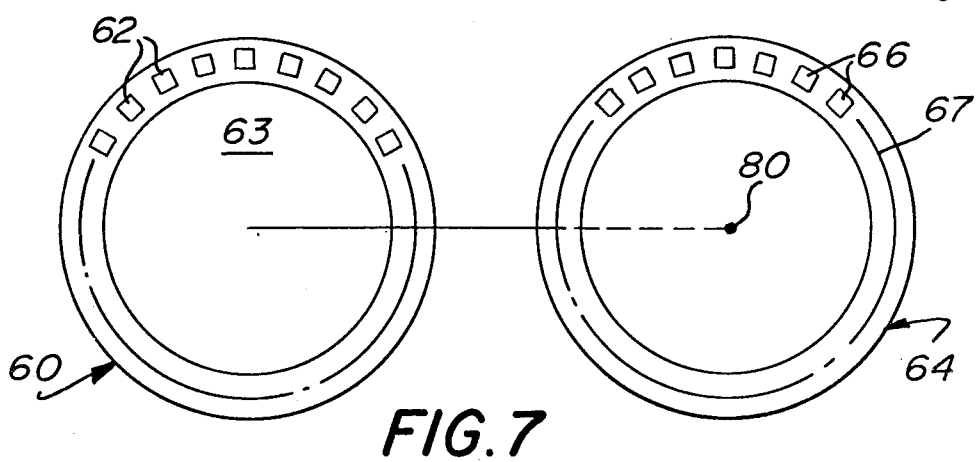

LUMINOUS CLOCK DISPLAY USING OPTICAL FIBERS

BACKGROUND OF THE DISCLOSURE

This application is related to a U.S. patent application filed this same day by A. S. Dostoomian individually for a LUMINOUS CLOCK DISPLAY USING OPTICAL FIBERS. That application is hereby incorporated by reference in this application.

In recent years, modern electronic technology has given rise to a wide variety of electric clocks having digital displays. The predominant method of creating digital clock displays has been by the use of light-emitting diodes (LED's). In most instances, these LED digital clocks are in the form of red or green seven-segment bar arrays representing the figure 8. By selectively energizing certain groups of bars, one can cause the array to display any of the ten Arabic numerals. The timing information which controls the selective energizing of the groups of bars is maintained by and distributed to the display by solid-state electronic logical devices containing no moving parts.

An alternative to the LED digital clock display is found in the use of optical fibers. Bundles of optical fiber light guides are selectively illuminated at one end and display horological information at the other end. The selective illumination of the proper bundle of optical fibers has been accomplished by using a rotating light source. In one form, the light source itself may be mounted on a shaft which is rotated by a conventional clock motor. Alternatively, a stationary central light source may be directed into one end of a U-shaped light guide while the opposite end is rotated by a conventional clock motor, or a prism and mirror system may be used where the mirror is rotated by a conventional clock motor. Clocks having a digital display produced in the manner just described are shown in U.S. Pat. No. 3,651,634.

There are difficulties associated with clocks having optical fiber displays generated in the manner described above. In a clock where a lamp is mounted on the end of a shaft which is being rotated by a conventional clock motor, electrical power to the lamp must normally be supplied through slip-ring electrical contacts. The problems normally associated with the use of slip-ring contacts, such as contamination, corrosion and wear are therefore a disadvantage of such clocks.

The slip-ring contact problem is greatly compounded if the clock is to include a simultaneous display of hours, minutes and seconds. Three lamps mounted on shafts moving at different speeds must be used, requiring three separate and electrically insulated slip rings to be incorporated onto a single clock motor.

Another limitation in using a rotating light source is that at any one time there is only one number on the time scale which is illuminated. While the U-shaped light guide system and the prism and mirror system disclosed in U.S. Pat. No. 3,651,634 eliminate the slip ring problems, they also illuminate only one number at one time.

There are decided advantages to having a digital display wherein all numbers are simultaneously illuminated except for the numbers indicating the present time, which are either darkened or illuminated in a different color. A digital display of this latter type presents a visual appearance analogous to that of a conventional analog clock face in which the position of the hands relative to the number scale is easily perceived. When the entire clock face is illuminated and visible, the relative position of the colored or darkened number presents an additional indication of time. By contrast, when only a single number is illuminated, the effect is more akin to a digital wrist watch, with the numeral being the only time indicator.

ADVANTAGES OF THE INVENTION

The present invention provides a luminous digital clock display using optical fiber light guides and a conventional clock motor. Since the clock motor is not required to rotate electrically powered light sources the need for slip-ring contacts is eliminated.

An additional advantage of the present invention is that a display may conveniently be provided in which the entire display face is illuminated, except for the numbers indicating the present time. Also, several novel and visually attractive visual effects can be incorporated onto the display through the use of the present invention, such as a shifting pattern of lights simulating the movement of a pendulum, or a bar of light streaking across a linear scale of numbers indicating minutes or seconds.

SUMMARY OF THE INVENTION

A clock is provided having a luminous display. The clock has an enclosed housing in which a display face is visible at one side of the housing. A stationary light source is located within the housing. Optical fiber light conductors are provided having their first ends disposed in holes arranged in annular concentric bands in a mounting structure and their second ends arranged in information patterns on the display face. The light conductors receive and conduct light from the light source to the display face. A clock motor provides a rotational output on a shaft corresponding to the longest time period to be displayed. An opaque disc is attached to the shaft to rotate therewith. The opaque disc has transparent filter windows located in annular segments of the disc. The disc is positioned between the light source and the concentric bands of light conductor first ends, so that light is blocked to the first ends within a concentric band except where a filter window is aligned with and is between the light source and the first ends.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 3 is a front view of a clock display corresponding to the mounting board configuration shown in FIG. 2;

FIG. 4 is a perspective view of a bundle of optical fiber light guides partially unraveled to form the number 5;

FIG. 5 is a front view of a segment of a linear time scale wherein a bar of light streaking across the scale is used to indicate time information;

FIG. 6 is a diagram showing a front view of a display of light guides arranged to show various positions of a pendulum and a rear view of the associated fiber bundle ends and discs containing a sinusoidal filter;

FIG. 7 is a diagram showing a pair of filter-bearing discs used in combination to produce the streaking bar of light shown in FIG. 5;

FIG. 8 is a diagram of a filter-bearing disc.

DETAILED DESCRIPTION OF THE INVENTION

Figure 1:
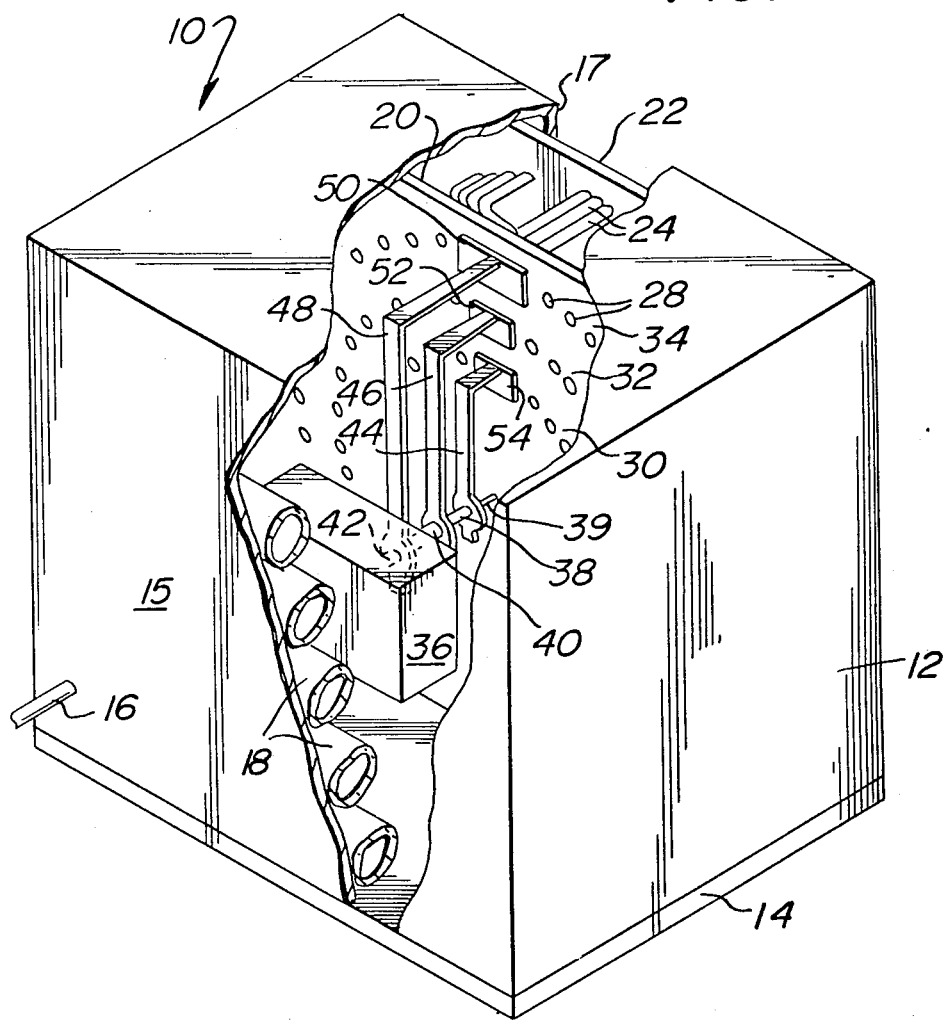
FIG. 1 is a perspective view of one embodiment of the invention partially cut away for purposes of illustration.

Turning now to the drawings, wherein like numerals indicate like elements, in FIG. 1 a clock 10 is shown according to the present invention. Clock 10 has an enclosed housing 12 and is mounted on a base 14. A power cord 16 is provided for connection to an external wall socket to provide electrical power for the clock motor and lights. Although not shown, batteries could be used instead of external power. The clock works could also be spring wound instead of being electrically powered.

A light source, here shown as fluorescent lamps 18, is mounted toward the rear wall 15 of the clock 10 and receives electrical power from power cord 16. The light source is not limited to fluorescent lamps, but fluorescent lamps are preferred over tungsten lamps because of their low heat generation, long life and small power consumption. Also, it is not necessary that the light source produce light in the visual spectrum. An ultraviolet source or infrared source could be used provided the optical fibers were made of material which becomes self luminous when irradiated by ultraviolet or infrared light respectively.

Mounting plate 20 is vertically disposed inside of housing 12. Mounting plate 20 is generally flat, with the ends of plate 20 abutting against the side walls of housing 12, so that the light from lamps 18 cannot pass between plate 20 and the side walls of housing 12.

Mounted inside of housing 12, on the side opposite light source 18, is display face 22. The front wall 17 of housing 12 covers display face 22 and preferably has a glass window (not visible in FIG. 1) so that the time display can be seen. While display face 22 is a separate panel in this embodiment, a variation would be to use one wall of housing 12 as the display face 22.

Referring now to FIG. 4, optical fiber bundles 24 are comprised of one or more optical fiber light guides 26. Guides 26 are twisted together to form bundles 24, and one end of each bundle 24 is fused together and disposed in one of the holes 28 in mounting plate 20. The opposite ends of bundles 24 may be disposed in similar holes which appear as dots 25 in display face 22 as shown in FIG. 3. Alternatively, the bundles 24 may be unraveled as shown in FIG. 4 and the ends of individual light guides 26 may be placed in dots 25.

The holes 28 in the mounting plate 20 are disposed in concentric circular bands. In the embodiment shown in FIG. 1, there are three such bands, 30, 32, and 34, corresponding to seconds, minutes and hours respectively.

Within each circular band there are a variety of possible patterns in which the holes 28 may be disposed. For instance, twelve of holes 28, each containing a fused end of an optical fiber bundle 24, could be placed on the mounting plate 20 at each 30° arcuate position of band 34, corresponding to the twelve hour integer positions on a clock face. Sixty holes could be placed at every 6° position on intermediate band 32 representing the minutes integers. On inner band 30, sixty more holes could be placed at every 6° position indicating seconds integers.

A clock motor 36, preferably an AC synchronous motor, is provided to turn a system of concentric shafts. Pin 39 is supported at one end by clock motor 36 and at its other end by mounting plate 20, and provides support for the shafts 38, 40 and 42 in the concentric array. The innermost shaft 38 of the concentric array is associated with the display of time in seconds. The next innermost shaft 40 in the concentric array is associated with time indication in minutes. The outer shaft 42 in the array is associated with indicating time in hours. Each of the concentric shafts is geared to run off the synchronous clock motor 36 at rotational speeds corresponding to hours, minutes, and seconds. Mounted on each of shafts 38, 40 and 42 are arms 44, 46, and 48 respectively.

Hour arm 48 is mounted on and rotates with hour shaft 42 at a speed such that arm 48 completes one revolution every twelve hours. Arm 48 is preferably thin and made of a clear material such as glass or plastic, so as not to interfere with light from lamps 18. In the embodiment shown, hour arm 48 is bent intermediate its length at approximately a 90° angle. Mounted on the free end of arm 48 is filter 50. It can be seen that the purpose of providing the 90° bend in arm 48 is to place filter 50 in close proximity to mounting plate 20 and the holes 28 associated therewith.

In a like manner, minute arm 46 is mounted on minute shaft 40 and rotates therewith at a speed corresponding to one revolution in every sixty minutes. Filter 52 is mounted on the free end of minute arm 46. Second arm 44 is mounted on second shaft 38 to rotate therewith at a speed corresponding to one revolution every sixty seconds. Filter 54 is mounted on the free end of second arm 44.

It can now be seen how this embodiment of the invention operates. With the clock 10 receiving power through cord 16, the fluorescent lamps 18 are illuminated and synchronous clock motor 36 turns the respective arms at rotational speeds corresponding to hours, minutes and seconds. Light from fluorescent lamps 18 is received by the fused ends of optical fiber bundles 24 disposed in the holes arranged in concentric bands on the mounting plate 20. The light is transmitted along the light guides 26 of the bundles 24 and appear as illuminated dots 25 on display face 22. In this embodiment, the illumination appears as plain white light.

Filters 50, 52 and 54 are colored filters, usually red, green or blue. When these filters pass before one or more of holes 28, the corresponding dots 25 on display face 22 will appear as colored lights. As the arms 44, 46 and 48 rotate, the filters 50, 52 and 54 cover different holes, with the result that different dots 25 on display face 22 are colored.

It can easily be seen that the dots 25 corresponding to the seconds positions are being covered by filter 54 fairly rapidly, so that on display face 22 it appears that the second indication is sweeping in a clockwise direction.

The minute filter 52 rotates at one-sixtieth of the speed of filter 54, and does not appear to be moving on display face 22 when stared at. However, by watching face 22 intently, one can notice the change in the colored dots, and can also see a gradual fade-in and fade-out of the dot color as filter 52 passes across the holes in the minute band 32. Additionally, instead of displaying the minutes integers as a dot on face 22, the bundles 24 can be unraveled as shown in FIG. 4 and the individual light guides 26 can be arranged to form numeral information. The Arabic numeral 5 is shown in FIG. 4, but other displays such as Roman numerals are equally usable. The display can also be varied, with only some of bundles 24 being unraveled and those light guides 26 formed into numerals, as for instance, for each five minute multiple. The minute indicators in between the five minuted multiples could be represented as dots simply by leaving bundles 24 raveled in display face 22.

The hours arm 48 moves so slowly that movement of the lights on display face 22 would not be discernible to a human observer. Consequently, when the bundles 24 are unraveled and form into a numeral as in FIG. 4, the numeral appears somewhat static with a little bit of fade-in and fade-out as the filter 50 comes into a covering position and then leaves uncovering the bundle end.

Figure 2:
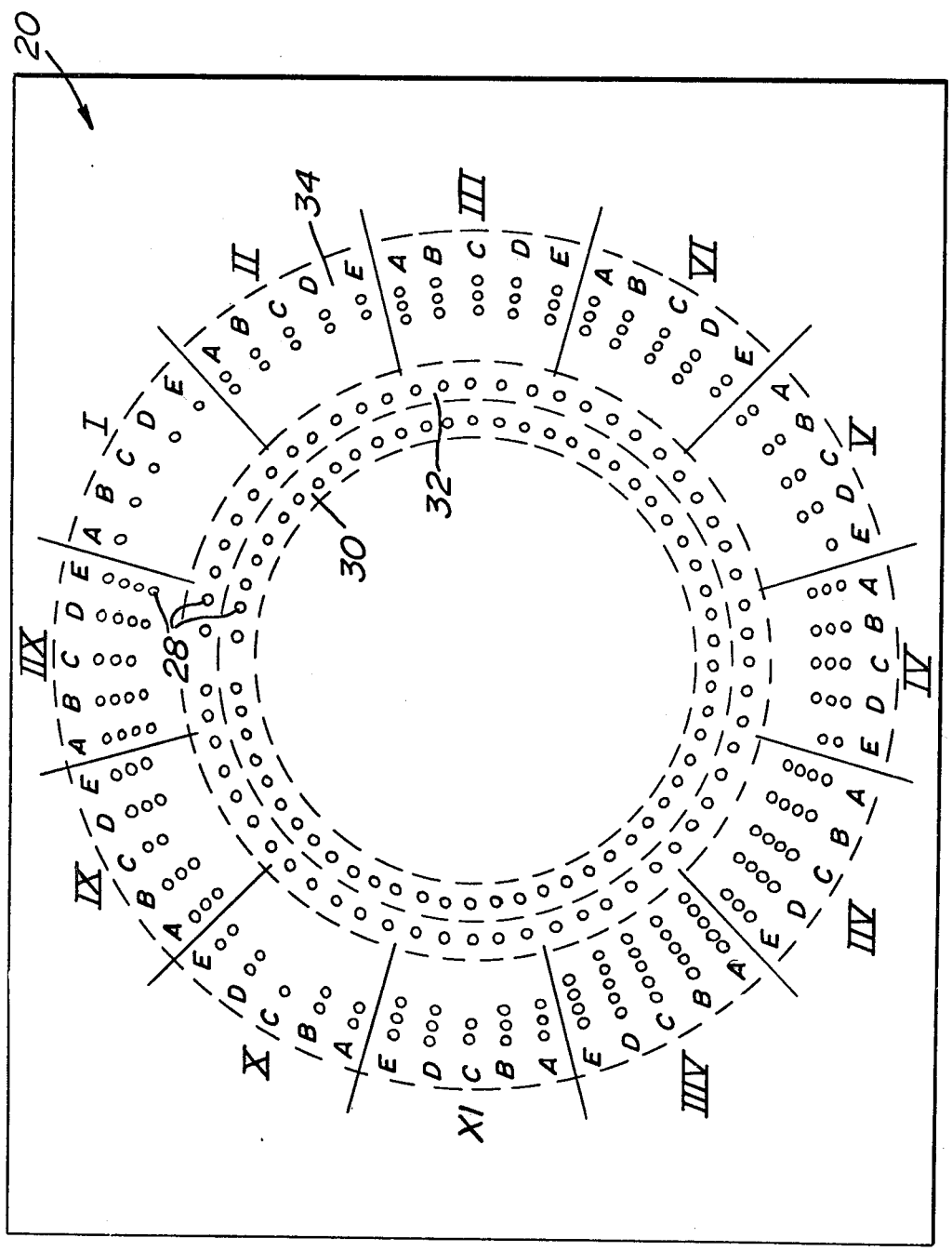
FIG. 2 is a rear view of the mounting board showing mounting positions for fiber bundles corresponding to one type of display.

A more intricate and artistically satisfying display of the hours information is shown in FIGS. 2 and 3. In FIG. 2, the holes 28 in plate 20 are in broad groups of 30° arcuate segments, each centered around the 30° positions of hour band 34. The hour filter 50 covers also a 30° arc segment or just slightly less. Within the 30° groups, the holes are arranged in five radial columns (designated A-E). From one to five holes 28 may appear in each column.

Filter 50 is large enough to mask out a 30° arcuate segment of hour band 48. When filter 50 is in a center position with respect to one of the 30° arcuate groups, all fiber bundles 24 in that 30° segment will be tinted by the filter color, and none of the other fiber bundles will be so tinted. As filter 50 moves clockwise from its center position in FIG. 2, the A column of the previous 30° segment becomes uncovered and the A column of the next 30° segment comes under and is covered by filter 50, and so on until the entire A-E columns of the previous segment are uncovered and filter 50 is masking out the entire A-E column of the next segment.

On display face 22, there are five rows (A-E) of possible positions for the dots 25 of the optical fiber bundles 24. Each row can have up to five dots 25 in column. The uppermost (A) row on display face 22 corresponds to the left-most (A) column on mounting plate 20. Thus, as filter 50 moves clockwise, the effect is that the bottom of the Roman numeral being uncovered is the first to turn back into white light, while the top of the numeral being covered is the first to have filtered light. Thus, for intrahour times, two partially colored numbers appear, with the amount of coloration becoming roughly proportionally greater as one of the hours is approached.

Filters 50, 52 and 54 of the present invention are not limited to the flag-type depicted in FIG. 1. For instance, an annular band covering the entire hour band 34 could be mounted on arm 48. Similar bands could be mounted on arms 46 and 44. If such bands were made opaque over most of their circumference and were provided with a clear or transparent window, the effect would be that only the numerals appearing behind the open portion would appear illuminated. Alternatively, the band could be mostly a filter of one color and have a window portion which filters light of a different color.

Another approach is shown in FIG. 8. A single disc 72 is transparent over its entire surface except for a series of concentric tracks upon which information is encoded in the form of opaque bars with periodic spacing. The innermost track 74 is divided into two half-rings, one of which is clear 76 and the other of which is opaque 78. Track 74 indicates A.M./P.M. information.

Disc 72 is mounted on a clock output shaft 80 which rotates at one/twenty-fourth of a revolution per hour. A set of optical fiber bundles have their fused ends mounted in a hole 82 corresponding to the A.M. display. Diametrically opposite hole 82 is a similar hole 84 containing the fused ends of optical fiber bundles corresponding to the P.M. display. It can be seen that opaque band 78 shields hole 82 from receiving light from source 18 for one-half revolution, or twelve hours, and shields hole 84 for the next twelve hours.

A second track 86 is opaque except for two diametrically opposed clear areas 88 and 90, each representing one/twenty-fourth of a disc revolution. An array of twelve holes containing optical fiber bundles 24 is disposed around one half of track 86 so that the twelve-hour display cycle occurs twice per revolution of shaft 80, or twice per day. Track 86 must bear a relationship to track 74 such that the center points of clear areas 88 and 89 are 90° from the line marking the interface of clear ring 76 and opaque ring 78, so that the transition from A.M. to P.M. occurs at twelve o'clock.

In order to add a minutes track, one might mount sixty small bundles of light conductors on the mounting board, but then they must occupy an arc length of only one twenty-fourth of the full circle so that the minute sequence will occur twenty four times per day. The minutes track would have twenty four transparent slits spaced equally around the outer track of the disc. Each slit would be about as wide as one bundle, the bundles would be nearly touching, and a fade-out/fade-in effect would be observed as the slit passed from one bundle to another. However, in a disc of practical size, it may not be convenient to mount sixty bundles so compactly, and the problem would be compounded if an additional seconds track were then to be added.

Accordingly, a different method of achieving these two additional tracks is suggested in FIG. 7. It makes use of the vernier-scale principal and of the moire pattern which is seen when two grids of slightly different periodicities are superimposed.

A stationary disc 60 is mounted adjacent to mounting plate 20 on the side between plate 20 and light source 18. Stationary disc 60 has twenty-four transparent window filters and a transparent center 63 as shown in FIG. 7.

A rotating disc 64 having two inside tracks similar to disc 72 is mounted to shaft 80. Disc 64 also has window filters 66 in its outer track 67, but on disc 64 there are twenty-five of such filters 66, as opposed to the twenty-four window filters 62 on disc 60. Disc 64 is mounted on shaft 42 and thus is between light source 18 and disc 60. The windows 66 on disc 64 are at a radial distance equal to that of the windows 62 on disc 60, and the centers of discs 60 and 64 are aligned so that windows 62 and 66 can be in register, allowing light to pass from source 18 to the bundles 24 on mounting plate 20. Disc 64 is positioned so that the uppermost window is in register with the upper window of disc 60 at the start of the timing sequence or zero minutes. Since there are twenty-four windows on disc 60 and twenty five windows on disc 64, it can be seen that the window filters on either side of the uppermost windows are nearly but not quite in register. The next furthest set of windows away from the uppermost set are even further out of register. This pattern continues on with the window at the 180° position of disc 64 being completely out of register with the lowermost filter on disc 60.

The result is a moire pattern around track 67, or a cyclic variation in the amount of light passed through discs 60 and 64. The brightest and darkest regions are opposite each other, and the shading is continuous in between.

If the window filters 62 and 66 are of a width approximately equal to the spacing between each filter 62 and 66, some light will be seen for nearly three-quarters of the way around the track. If the window filters 62 and 64 are made narrower than the spaces in between, the region will be shortened, but there will be less light at the maximum.

As disc 64 turns in a clockwise direction, the windows move into different percentages of register and the moire pattern shifts in a clockwise direction. The moire pattern will make a complete cycle when disc 64 has turned one-twenty fourth of a rotation (14.4°). Thus, the interference pattern will move exactly twenty four times faster than disc 64.

This effect can be used for an effective minutes display, shown as 68 in FIG. 5. In the minutes bands 32, sixty of bundles 24 are spaced one at each 6° of arc. The opposite ends of bundles 24 are mounted on display face 22 behind a linear display of numerals from one to sixty, as shown in FIG. 5. Each light bundle 24 in the minute band 32 terminates behind its corresponding number on display 68, and the light is diffused so that the entirety of the corresponding number and the immediate surrounding area appear to be illuminated.

Thus, because of the movement of the moire pattern, the effect will be that of a luminous streak along the minute indicating display 68. The A.M./P.M. information and the hour display would be produced by two inner tracks of disc 64 in the same manner as in disc 72.

A similar display 70 could be used to display seconds. In that case, the rotating disc 64 would have a fourth track with 1441 windows or transparent slits. The stationary disc 60 would have 1440 windows. The moire pattern would rotate 1440 times faster than shaft 80.

Also, if no A.M./P.M. indications are desired, the clock motor shaft would only have to make one revolution every 12 hours. In that event, the stationary disc would need 12 windows and the rotating disc 13 for a minutes display. For a seconds display, the stationary disc would need 720 windows and the rotating disc 721 windows.

If the clock motor shaft made only one revolution per hour, a moire pattern would not be convenient for a minutes display, but a seconds display in which the stationary disc has 60 windows and the rotary disc has 61 could be used.

Another interesting visual effect is created by the arrangement of optical fibers and the type of filters shown in FIG. 6. The optical fiber bundles 24 have their fused ends mounted in holes 28 in mounting plate 20 in a vertical column (A–G). The opposite ends of bundle 24 are unraveled and the individual light guides 26 are arranged on display face 22 in patterns (A–G) depicting a clock pendulum in different positions of a swing. A circular band 56 of opaque material is mounted on an arm, driven by the clock motor 36. A transparent filter 58 in the shape of a sinusoidal wave is incorporated onto disc 56, so that light from source 18 may pass through disc 56 by way of filter 58 and illuminate the bundle 24 which is in line with filter 58 at the time. The points of transmission of the sine wave of filter 58 pass over the top (A) and bottom (G) hole of the column of holes (A–G). The slope of the sine wave of filter 58 varies at the points at which it covers the remaining holes (B–F), with the steepest slope being at the middle hole (D) and becoming increasingly less towards the top and bottom. Thus, the top and bottom of holes are illuminated longer than the next innermost holes (B and F) which are in turn illuminated longer than the next (C and E) which are in turn illuminated longer than the middle (D). The length of illumination corresponds to the sinusoidal period of a pendulum swing. The pendulum positions on display face 22 are thus illuminated in a sequence and at a frequency that is representative of an actual swinging pendulum, and creates an interesting and pleasing clock effect.

The displays described above may be combined into any variety of combinations in a particular clock. Moreover, it is likely that additional displays can be developed for a clock using the invention.

It is therefore apparent that the present invention may be embodied in other specific forms without departing from the spirit or essential attributes thereof and, accordingly, reference should be made to the appended claims, rather than to the foregoing specification, as indicating the scope of the invention.

We claim:
1. A clock having a luminous display, comprising:
   (a) an enclosed housing having a display face visible at one side thereof;
   (b) a stationary light source within the housing;
   (c) optical fiber light conductors disposed to receive light at first ends from the light source and to conduct such received light to pre-determined points on the display face, said first ends being arranged in patterns within annular concentric bands, each of the bands corresponding to a different time period from the group consisting A.M./P.M., hours, minutes and seconds;
   (d) a clock motor providing a rotational output on a shaft corresponding to the longest said time periods;
   (e) an opaque disc attached to the shaft to rotate therewith, said opaque disc having transparent filter windows located in annular segments of said disc, said disc being positioned between the light source and the concentric bands of light conductor ends, so that light is blocked to the first ends within a concentric band except where a filter window is aligned with and between the light source and the first ends.

2. A clock having a luminous display, comprising:
   (a) an enclosed housing;
   (b) a display face visible at one end of the housing;
   (c) a stationary light source within the housing;
   (d) optical fiber light conductors having first ends disposed in a mounting structure and arranged at uniform arcuate spacings within an annular concentric band, to receive and conduct light through the optical fiber light conductors to second ends arranged in information patterns on the display face;
   (e) a clock motor for providing on an output shaft a rotational output corresponding to units of time;
   (f) a stationary disc having N number of window filters uniformly spaced in an annular band of said stationary disc;
   (g) a second disc rotatably mounted on the output shaft of the clock motor, said second disc having N+1 window filters uniformly spaced in an annular band of said second disc;

(h) said first and second discs being mounted between the light source and the first end of the light conductors, and being in position relative to each other such that at the beginning of the timing period of said window filters, one from each disc, are in register.

3. A clock as in claim 2 wherein the output shaft of the clock motor makes one revolution every twenty-four hours and a number N equals twenty-four for the display indicating minutes.

4. A clock as in claim 2 wherein the clock motor output shaft makes one revolution every twenty-four hours and the number N equals one thousand four hundred-forty for a display indicating seconds.

5. A clock as in claim 2 wherein the clock motor output shaft makes one revolution every twelve hours and the number N equals twelve for a display indicating minutes.

6. A clock as in claim 2 wherein the clock motor output shaft makes one revolution every twelve hours and the number N equals seven hundred-twenty for a display indicating seconds.

7. A clock as in claim 2 wherein the clock motor output shaft makes one revolution every hour and the number N equals sixty for a display of seconds.

8. A clock as in either of claims 1 or 2, further comprising:
(a) additional optical fiber light conductors disposed to receive light at first ends thereof from the light source and to conduct such light to pre-determined points on the display face, said first ends being arranged in a vertical column;
(b) an opaque disc attached to the shaft of the clock motor to rotate with the shaft, said opaque disc having a transparent filter in the form of a continuous sinusoidal band in such position that light from the light source is blocked by the opaque disc from reaching the first ends of the additional light conductors except where the sinusoidal filter is between the light source and the first ends of the additional light conductors;
(c) the second ends of the additional light conductors being arranged in a pattern on the display face to depict a pendulum at various points in a swing.

* * * * *